United States Patent
Ono et al.

(10) Patent No.: US 9,981,666 B2
(45) Date of Patent: May 29, 2018

(54) CONTROLLER FOR VEHICLE

(71) Applicant: TOYOTA JIDOSHA KABUSHIKI KAISHA, Toyota-shi, Aichi (JP)

(72) Inventors: Tomohito Ono, Susono (JP); Takahito Endo, Shizuoka-ken (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/110,838

(22) PCT Filed: Jan. 13, 2015

(86) PCT No.: PCT/IB2015/000015
§ 371 (c)(1),
(2) Date: Jul. 11, 2016

(87) PCT Pub. No.: WO2015/107407
PCT Pub. Date: Jul. 23, 2015

(65) Prior Publication Data
US 2016/0325752 A1    Nov. 10, 2016

(30) Foreign Application Priority Data
Jan. 14, 2014  (JP) ................. 2014-004510

(51) Int. Cl.
*B60W 30/20* (2006.01)
*B60K 6/383* (2007.10)
(Continued)

(52) U.S. Cl.
CPC ............. *B60W 30/20* (2013.01); *B60K 6/383* (2013.01); *B60K 6/387* (2013.01); *B60K 6/445* (2013.01);
(Continued)

(58) Field of Classification Search
CPC .... B60W 10/02; B60W 10/08; B60W 10/182; B60W 30/18027; B60W 30/18118;
(Continued)

(56) References Cited

U.S. PATENT DOCUMENTS 6,054,776 A    4/2000  Sumi
2003/0029653 A1  2/2003  Fujikawa
(Continued)

FOREIGN PATENT DOCUMENTS

JP    3354074 B2    12/2002
JP    2003052102 A   2/2003
(Continued)

*Primary Examiner* — Erin D Bishop
*Assistant Examiner* — Lori Wu
(74) *Attorney, Agent, or Firm* — Hunton Andrews Kurth LLP

(57) ABSTRACT

A controller for a vehicle is provided. The vehicle includes an engine, a rotary machine, at least one driving wheel, a first clutch disposed between a power transmission member and the rotary machine, the power transmission member being disposed between the engine and the driving wheel, the first clutch being configured to be switched to an engaged state or a disengaged state, and a second clutch disposed in parallel with the first clutch, the second clutch being a one-way clutch. The controller includes an electronic control unit. The electronic control unit is configured to control at least one of the rotary machine or the first clutch so as to reduce inertia of the power transmission member based on a torsional load acting on the power transmission member.

8 Claims, 11 Drawing Sheets

(51) Int. Cl.

| | |
|---|---|
| *B60K 6/387* | (2007.10) |
| *B60K 6/445* | (2007.10) |
| *B60W 10/02* | (2006.01) |
| *B60W 10/18* | (2012.01) |
| *B60W 20/00* | (2016.01) |
| *B60W 30/18* | (2012.01) |
| *B60W 10/08* | (2006.01) |
| *B60K 6/38* | (2007.10) |

(52) U.S. Cl.
CPC ............ *B60W 10/02* (2013.01); *B60W 10/08* (2013.01); *B60W 10/182* (2013.01); *B60W 20/00* (2013.01); *B60W 30/18027* (2013.01); *B60W 30/18118* (2013.01); *B60K 2006/381* (2013.01); *B60W 2510/109* (2013.01); *B60W 2510/188* (2013.01); *B60W 2550/141* (2013.01); *B60W 2550/147* (2013.01); *B60W 2710/08* (2013.01); *B60W 2710/1033* (2013.01); *B60W 2710/186* (2013.01)

(58) Field of Classification Search
CPC .......... B60W 30/20; B60W 2510/109; B60W 2510/188; B60W 2510/08; B60W 2550/141; B60W 2550/142; B60W 2550/147; B60W 2710/08; B60W 2710/186; B60K 6/383; B60K 6/387; B60K 6/445
See application file for complete search history.

(56) References Cited

U.S. PATENT DOCUMENTS

| | | | | |
|---|---|---|---|---|
| 2005/0245349 | A1* | 11/2005 | Tabata | B60K 6/38 477/3 |
| 2010/0116235 | A1* | 5/2010 | Imamura | B60K 6/445 123/179.3 |
| 2010/0235063 | A1 | 9/2010 | Kawamoto et al. | |
| 2011/0172889 | A1* | 7/2011 | Zhang | B60K 23/06 701/54 |
| 2012/0316034 | A1* | 12/2012 | Lim | B60W 10/06 477/183 |
| 2014/0288754 | A1* | 9/2014 | Kasuya | B60K 6/48 701/22 |
| 2015/0057126 | A1 | 2/2015 | Harada et al. | |

FOREIGN PATENT DOCUMENTS

| | | |
|---|---|---|
| JP | 2003-111205 A | 4/2003 |
| JP | 2003294123 A | 10/2003 |
| JP | 2007118718 A | 5/2007 |
| JP | 2007-314146 A | 12/2007 |
| JP | 2011098706 A | 5/2011 |
| JP | 2012154253 A | 8/2012 |
| JP | 2013-096555 A | 5/2013 |
| WO | 2013/145102 A1 | 10/2013 |

* cited by examiner

AXIS DIRECTION

FIG. 8

|  | MG2 POSITIVE TORQUE (POWERING, ENGINE START, etc.) | MG2 NEGATIVE TORQUE (REGENERATION, etc.) |
|---|---|---|
| MG2 POSITIVE ROTATION (Fwd) | CL2 | CL1 |
| MG2 NEGATIVE ROTATION (Rev) | CL1 | CL1 |

AXIS DIRECTION

AXIS DIRECTION

CONTROLLER FOR VEHICLE

CROSS-REFERENCE TO RELATED APPLICATIONS

This is a national phase application based on the PCT International Patent Application No. PCT/IB2015/000015 filed Jan. 13, 2015, claiming priority to Japanese Patent Application No. 2014-004510 filed Jan. 14, 2014, the entire contents of both of which are incorporated herein by reference.

BACKGROUND OF THE INVENTION

1. Field of the Invention

The present invention relates to a controller for a vehicle.

2. Description of Related Art

In the related art, a vehicle including a one-way clutch is known. For example, Japanese Patent Application Publication No. 2013-96555 (JP 2013-96555 A) discloses a technique of a connection mechanism for a vehicle driving system which is provided with a one-way clutch and a mechanical connection and disconnection unit in which a sleeve or a pole can mesh with dog-teeth so as to be parallel to the one-way clutch. JP 2013-96555 A also discloses a configuration in which the one-way clutch and the mechanical connection and disconnection unit are disposed between a second MG 58 and a transmission gear 12a. In the technique disclosed in JP 2013-96555 A, the mechanical connection and disconnection unit is engaged when the vehicle travels in reverse.

SUMMARY OF THE INVENTION

In the related art, suppression of generation of vibration in a power transmission member has not been satisfactorily studied. For example, when a power transmission member between an engine and driving wheels has large inertia, there is a problem in that vibration is likely to be generated or the time required until the generated vibration converges extends due to a torsional load. For example, when a rotary machine is connected to the power transmission member between the engine and the driving wheels, the rotary machine contributes to the inertia of the transmission member. Accordingly, there is a problem in that vibration is likely to be generated or the time required until generated vibration converges extends due to a torsional load.

The reason for the torsional load is explained in a case in which a torsional load acts on the transmission member by torque input from tires or the like in a state where the rotation of the transmission member is regulated by a parking unit. In this case, when the parking unit is unlocked and thus torsional energy is released, the transmission member may vibrate and a shock or the like may occur. Another example is a case in which a vehicle travels on an uneven road. On an uneven road, the transmission member may vibrate due to torque input from a road surface.

An object of the invention provides a controller for a vehicle that can suppress vibration of a power transmission member.

According to a first aspect of the invention, there is provided a controller for a vehicle. The vehicle includes an engine, a rotary machine, at least one driving wheel, a first clutch disposed between a power transmission member and the rotary machine, the power transmission member being disposed between the engine and the driving wheel, the first clutch being configured to be switched to an engaged state or a disengaged state, and a second clutch disposed in parallel with the first clutch, the second clutch being a one-way clutch. The controller includes an electronic control unit; The electronic control unit is configured to control at least one of the rotary machine or the first clutch so as to reduce inertia of the power transmission member based on a torsional load acting on the power transmission member.

According to a second aspect of the invention, there is provided a controller for a vehicle. The vehicle includes an engine, a rotary machine, at least one driving wheel, a first clutch disposed between a power transmission member and the rotary machine, the power transmission member being disposed between the engine and the driving wheel, the first clutch being configured to be switched to an engaged state or a disengaged state, and a second clutch disposed in parallel with the first clutch, the second clutch being a one-way clutch. The controller includes an electronic control unit. The electronic control unit is configured to control at least one of the rotary machine or the first clutch so as to intercept power transmission between the power transmission member and the rotary machine based on a torsional load acting on the power transmission member.

In the aspects, the vehicle may include a parking unit configured to switch between a locked state in which rotation of the transmission member is inhibited and an unlocked state in which the rotation of the transmission member is permitted. The electronic control unit may be configured to rotate the rotary machine in a rotation direction in which the second clutch is disengaged before switching the parking unit to the unlocked state when a request to switch the parking unit to the unlocked state is given.

In the aspects, the electronic control unit may be configured to rotate the rotary machine in the rotation direction in which the second clutch is disengaged when the request to switch the parking unit to the unlocked state is given and the vehicle is stationary on a slope road.

In the aspects, the electronic control unit may be configured to output a command to switch the parking unit to the unlocked state after rotating the rotary machine in the rotation direction in which the second clutch is disengaged.

In the aspects, the electronic control unit may be configured to disengage the first clutch when the electronic control unit detects that the vehicle travels on an uneven road.

The first aspect of the invention provides a controller for a vehicle. The vehicle includes an engine, a rotary machine, at least one driving wheel, a first clutch disposed between a power transmission member and the rotary machine, the power transmission member being disposed between the engine and the driving wheel, the first clutch being configured to be switched to an engaged state or a disengaged state, and a second clutch disposed in parallel with the first clutch, the second clutch being a one-way clutch. The controller includes an electronic control unit. The electronic control unit is configured to control at least one of the rotary machine or the first clutch so as to reduce inertia of the power transmission member based on a torsional load acting on the power transmission member. In the controller for a vehicle according to the invention, it is possible to suppress vibration of the power transmission member by reducing the inertia of the power transmission member depending on the torsional load acting on the power transmission member.

The second aspect of the invention provides a controller for a vehicle. The vehicle includes an engine, a rotary machine, at least one driving wheel, a first clutch disposed between a power transmission member and the rotary machine, the power transmission member being disposed between the engine and the driving wheel, the first clutch being configured to be switched to an engaged state or a disengaged state, and a second clutch disposed in parallel with the first clutch, the second clutch being a one-way clutch. The controller includes an electronic control unit. The electronic control unit is configured to control at least one of the rotary machine or the first clutch so as to intercept power transmission between the power transmission member and the rotary machine based on a torsional load acting on the power transmission member. In the controller for a vehicle according to the invention, it is possible to suppress vibration of the power transmission member by intercepting power transmission between the power transmission member and the rotary machine depending on the torsional load acting on the power transmission member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a diagram illustrating an operation engagement table according to the first embodiment;

DETAILED DESCRIPTION OF EMBODIMENTS

Hereinafter, a vehicle controller according to an embodiment of the invention will be described in detail with reference to the accompanying drawings. The invention is not limited to the embodiment. Elements in the below embodiment include elements that can be easily conceived of by those skilled in the art or elements that are substantially identical thereto.

A first embodiment of the invention will be described below with reference to FIGS. 1 to 10. This embodiment provides a vehicle controller.

Figure 2:
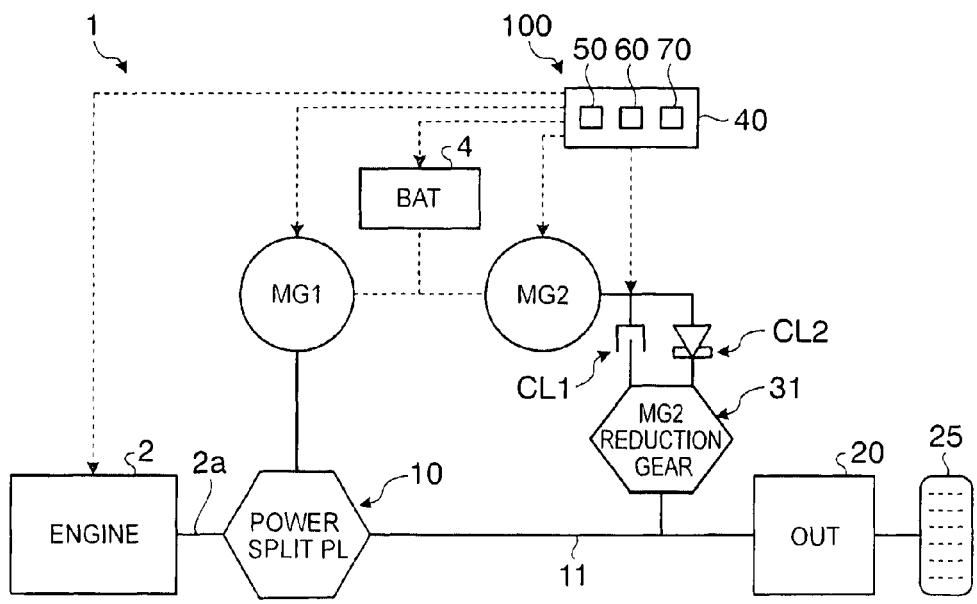
FIG. 2 is a diagram schematically illustrating a configuration of a vehicle according to the first embodiment.

As illustrated in FIG. 2, a vehicle 1 according to this embodiment includes an engine 2, a first rotary machine MG1, a second rotary machine MG2, a battery 4, a planetary gear mechanism 10, a first clutch CL1, a second clutch CL2, a control unit 40, and an output shaft 20. The vehicle 1 is a hybrid vehicle including the engine 2 and two rotary machines MG1, MG2 as drive sources. The vehicle 1 may be a plug-in hybrid vehicle (PHV) that can be charged with an external power source.

A vehicle control system 100 according to this embodiment includes the engine 2, the second rotary machine MG2, the first clutch CL1, the second clutch CL2, and the control unit 40 in the vehicle 1.

The engine 2 converts the combustion energy of fuel into the rotation of an output shaft 2a and outputs the rotation. The planetary gear mechanism 10 has a function as a power splitting planetary gear that splits the power output from the engine 2 into the output shaft 20 side and the first rotary machine MG1 side. The first rotary machine MG1 and the second rotary machine MG2 have a function as a motor (electric motor) and a function as a power generator. The first rotary machine MG1 and the second rotary machine MG2 are connected to the battery 4 via an inverter. The power generated by the rotary machines MG1, MG2 can be stored in the battery 4. For example, a three-phase AC synchronization type motor-generator set can be used as the first rotary machine MG1 and the second rotary machine MG2.

The first clutch CL1 is a clutch unit that is disposed between a power transmission member 11 and the second rotary machine MG2 and that can be arbitrarily switched to an engaged state or a disengaged state. Here, the power transmission member 11 is a path for transmitting power from the engine 2 to the driving wheels 25. The second clutch CL2 is a one-way clutch disposed in parallel with the first clutch CL1. For example, a sprag type one-way clutch can be used as the second clutch CL2.

The second rotary machine MG2 transmits and receives power to and from the power transmission member 11 via at least one of the first clutch CL1 or the second clutch CL2. The power output from the engine 2 and the second rotary machine MG2 to the power transmission member 11 is transmitted to the driving wheels 25 via the output shaft 20.

The vehicle control system 100 according to this embodiment has a predetermined traveling mode in which the vehicle 1 travels forward in a state in which the rotation of the second rotary machine MG2 is stopped. In the predetermined traveling mode, the first clutch CL1 is in the disengaged state. By disengaging the first clutch CL1 and separating the second rotary machine MG2 from the power transmission member 11, the rotation of the second rotary machine MG2 along with the rotation of the power transmission member 11 is suppressed. Accordingly, a dragging loss or a mechanical loss in the secondary rotary machine MG2 is reduced. Since the loss occurring in the second rotary machine MG2 is reduced, the output power of the engine 2 can be reduced by the loss. Accordingly, the vehicle control system 100 according to this embodiment can achieve a decrease in loss or an improvement in fuel efficiency of the vehicle 1 by carrying out the predetermined traveling mode.

Figure 3:
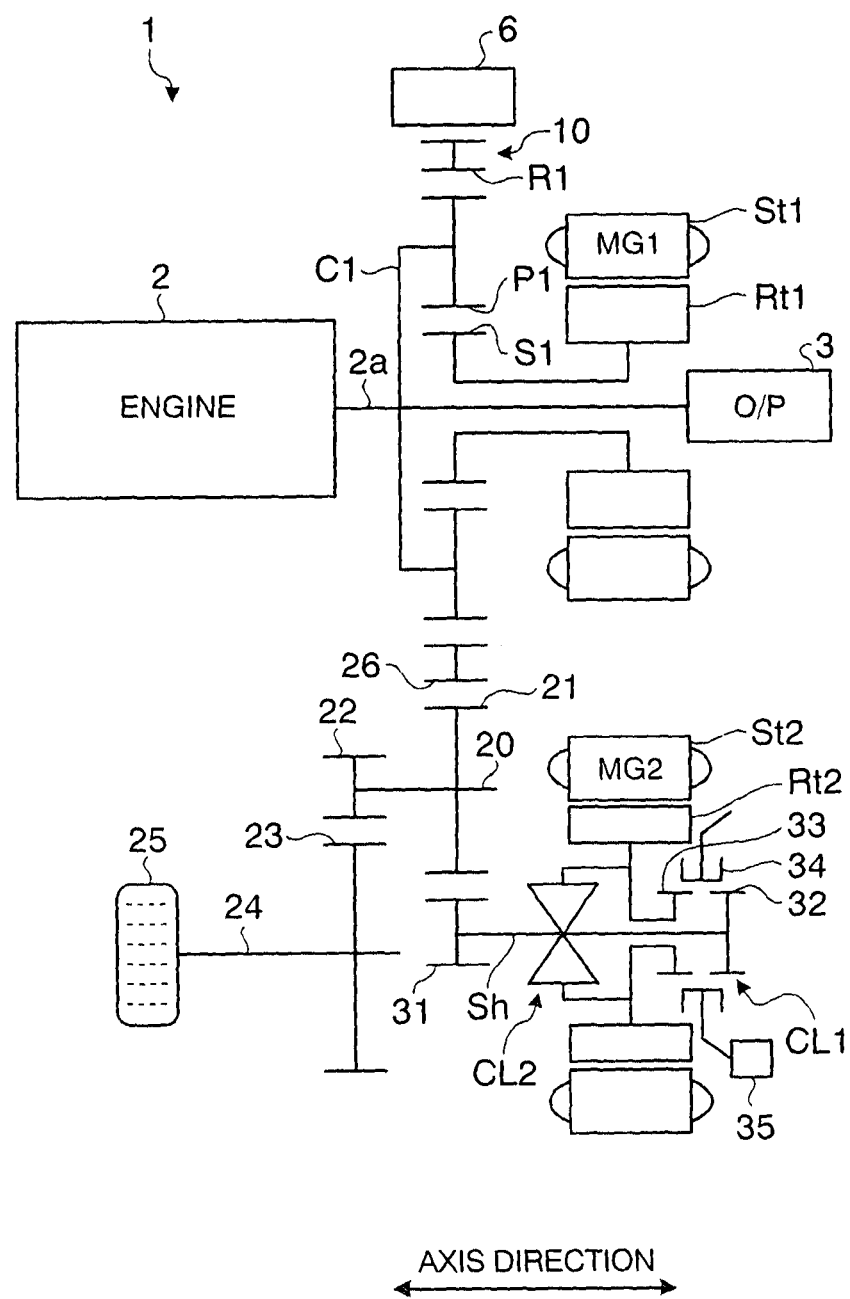
FIG. 3 is a skeleton diagram of the vehicle according to the first embodiment.

An example of the specific configuration of the vehicle 1 will be described below with reference to FIG. 3. As illustrated in FIG. 3, the output shaft 2a of the engine 2 is connected to a carrier C1 of the planetary gear mechanism 10. The planetary gear mechanism 10 is a single-pinion planetary gear mechanism. The planetary gear mechanism 10 includes a sun gear S1, a pinion gear P1, a ring gear R1, and a carrier C1. The planetary gear mechanism 10 is disposed between the engine 2 and the first rotary machine MG1 in the axis direction of the output shaft 2a. The planetary gear mechanism 10 and the first rotary machine MG1 are arranged to be coaxial with the engine 2. The axis direction of the engine 2 is parallel to, for example, the vehicle width direction.

The first rotary machine MG1 includes a rotor Rt1 that is rotatably supported and a stator St1 that is fixed to a vehicle body side. The sun gear S1 is connected to the rotor Rt1 of the first rotary machine MG1 and rotates along with the rotor Rt1. An output gear 26 disposed on the outer circumference of the ring gear R1 meshes with a driven gear 21. The driven gear 21 is a gear connected to the output shaft 20. The output shaft 20 is a shaft parallel to the output shaft 2a of the engine 2 and a rotation shaft Sh to be described later. A drive pinion gear 22 is connected to the output shaft 20. The drive pinion gear 22 meshes with a final gear 23. The final gear 23 is connected to the driving wheels 25 via a drive shaft 24. A differential gear may be disposed between the final gear 23 and the drive shaft 24.

A reduction gear 31 meshes with the driven gear 21. The reduction gear 31 is connected to the rotation shaft Sh. The second rotary machine MG2 is disposed to be coaxial with the rotation shaft Sh. The second rotary machine MG2 includes a rotor Rt2 that is rotatably supported and a stator St2 that is fixed to the vehicle body side. The first clutch CL1 and the second clutch CL2 are disposed between the rotation shaft Sh and the rotor Rt2 of the second rotary machine MG2.

The first clutch CL1 in this embodiment is a meshing type dog clutch. The first clutch CL1 includes first dog-teeth 32, second dog-teeth 33, a sleeve 34, and an actuator 35. The first dog-teeth 32 are dog-teeth connected to the rotation shaft Sh. The second dog-teeth 33 are dog-teeth connected to the rotor Rt2 of the second rotary machine MG2. The first dog-teeth 32 and the second dog-teeth 33 are, for example, teeth extending linearly in the axis direction of the rotation shaft Sh. The sleeve 34 is supported to be movable in the axis direction of the rotation shaft Sh. The sleeve 34 has dog-teeth corresponding to the first dog-teeth 32 and the second dog-teeth 33.

The actuator 35 engages or disengages the first clutch CL1 by moving the sleeve 34 in the axis direction of the rotation shaft Sh. The first clutch CL1 in this embodiment is a normally-open type clutch and is switched to the disengaged state when the actuator 35 does not generate a drive force. The actuator 35 drives the sleeve 34 in one direction (engagement direction) of the axis direction of the rotation shaft Sh, for example, with an electromagnetic force. On the other hand, the sleeve 34 is impelled in the direction (disengagement direction) opposite to the direction of the drive force based on the actuator 35 with an impelling member such as a spring. Accordingly, the sleeve 34 is maintained in the disengaged state with the impelling force of the impelling member when the actuator 35 does not generate a drive force. The actuator 35 moves the sleeve 34 in the engagement direction with the generated drive force against the impelling force so as to cause the sleeve 34 to engage with both the first dog-teeth 32 and the second dog-teeth 33. Accordingly, the first clutch CL1 is engaged and thus the rotation shaft Sh and the rotor Rt2 are connected via the sleeve 34 so as to rotate together.

In this embodiment, among both of the rotation directions of the second rotary machine MG2, the same direction as the rotation direction of the rotation shaft Sh when the vehicle 1 travels forward is referred to as a "positive rotation direction". Among both of the rotation directions of the second rotary machine MG2, the reverse rotation direction of the positive rotation direction is referred to as a "negative rotation direction" or a "reverse rotation direction". Among the torques of the second rotary machine MG2, the torque in the same direction as the rotation direction of the second rotary machine MG2 is referred to as a "positive torque". Among the torques of the second rotary machine MG2, the torque in the reverse direction of the rotation direction of the second rotary machine MG2 is referred to as a "negative torque" or a "reverse torque". That is, the positive torque is a torque in the direction in which the absolute value of the rotation speed of the second rotary machine MG2 increases. On the other hand, the negative torque is a torque in the direction in which the absolute value of the rotation speed of the second rotary machine MG2 decreases, that is, in the direction in which the positive rotation of the second rotary machine MG2 decreases.

The second clutch CL2 can transmit the torque in the positive rotation direction from the second rotary machine MG2 to the rotation shaft Sh and intercepts the torque in the negative rotation direction. On the other hand, the second clutch CL2 can transmit the torque in the negative rotation direction from the rotation shaft Sh to the second rotary machine MG2 and intercepts the torque in the positive rotation direction.

An oil pump 3 is connected to the output shaft 2a of the engine 2. The oil pump 3 ejects oil with the rotation of the engine 2. The oil pump 3 supplies oil to a power transmission part including the first rotary machine MG1 and the second rotary machine MG2. The oil supplied by the oil pump 3 lubricates and cools the first rotary machine MG1 and the second rotary machine MG2. The oil pump 3 may supply oil to a lubricated part including the planetary gear mechanism 10.

The parking unit 6 is a device that inhibits rotation of the power transmission member between the engine 2 and the driving wheels 25. The parking unit 6 in this embodiment is configured to regulate rotation of the output gear 26. For example, the parking unit 6 includes a parking pawl engaging with the output gear 26 and an actuator driving the parking pawl. The parking unit 6 can switch to a, locked state in which the rotation of the output gear 26 is inhibited and an unlocked state in which the rotation of the output gear 26 is permitted. The parking unit 6 in this embodiment switches to the unlocked state or the locked state in response to a command from the control unit 40.

Figure 4:
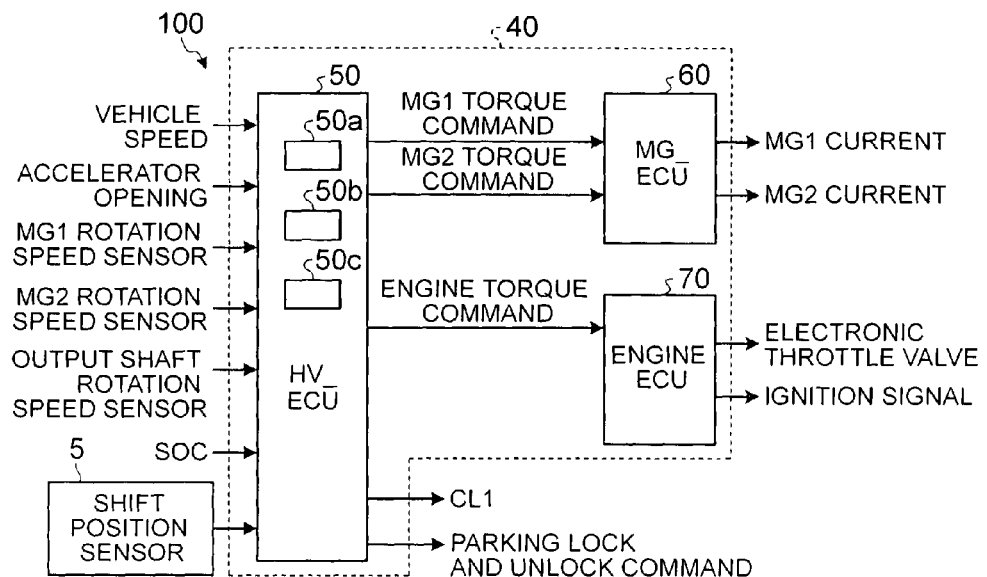
FIG. 4 is a block diagram illustrating the controller for a vehicle according to the first embodiment.

As illustrated in FIG. 4, the control unit 40 includes an HV_ECU 50, an MG_ECU 60, and an engine ECU 70. The control unit 40 has a function of controlling the traveling of the vehicle 1. The ECUs 50, 60, and 70 are, for example, electronic control units having a computer. The HV_ECU 50 has a function of comprehensively controlling the entire vehicle 1. The MG_ECU 60 and the engine ECU 70 are electrically connected to the HV_ECU 50.

The MG_ECU 60 can control the first rotary machine MG1 and the second rotary machine MG2. For example, the MG_ECU 60 adjusts a current value supplied to the first rotary machine MG1 so as to control the output torque of the first rotary machine MG1. For example, the MG_ECU 60 adjusts a current value supplied to the second rotary machine MG2 so as to control the output torque of the second rotary machine MG2.

For example, the engine ECU 70 can perform controlling an electronic throttle valve of the engine 2, outputting an ignition signal to control the ignition of the engine 2, and controlling injection of fuel into the engine 2.

A vehicle speed sensor, an accelerator opening sensor, an MG1 rotation speed sensor, an MG2 rotation speed sensor, an output shaft rotation speed sensor, a battery sensor, and the like are connected to the HV_ECU 50. The HV_ECU 50 can acquire a vehicle speed, an accelerator opening, a rotation speed of the first rotary machine MG1, a rotation speed of the second rotary machine MG2, a rotation speed of the output shaft 20, a battery state SOC, and the like from the sensors. The HV_ECU 50 is connected to a shift position sensor 5 and acquires information indicating the detection result of the shift position sensor 5.

The HV_ECU 50 includes a drive force calculating unit 50a, a mode determining unit 50b, and a reduction control instructing unit 50c. The drive force calculating unit 50a calculates a request drive force for the vehicle 1 on the basis of information acquired by the HV_ECU 50. The drive force calculating unit 50a may calculate request power, a request torque, and the like instead of the request drive force. The HV_ECU 50 determines the output torque of the first rotary machine MG1 (hereinafter, also referred to as "MG1 torque"), the output torque of the second rotary machine MG2 (hereinafter, also referred to as "MG2 torque"), and the output torque of the engine 2 (hereinafter, also referred to as "engine torque") on the basis of the request value calculated by the drive force calculating unit 50a. The HV_ECU 50 outputs a command value of the MG1 torque and a command value of the MG2 torque to the MG_ECU 60. The HV_ECU 50 outputs a command value of the engine torque to the engine ECU 70.

The traveling state of the vehicle 1 will be described below with reference to the accompanying drawings. In the collinear diagrams illustrated in FIGS. 5 to 7, the S1 axis represents the rotation speed of the sun gear S1 and the first rotary machine MG1. In the collinear diagrams illustrated in FIGS. 5 to 7, the C1 axis represents the rotation speeds of the carrier C1 and the engine 2. In the collinear diagrams illustrated in FIGS. 5 to 7, the R1 axis represents the rotation speed of the ring gear RE The OUT axis represents the rotation speed of the output shaft 20. The Sh axis represents the rotation speed of the rotation shaft Sh. The Rt2 axis represents the rotation speed of the rotor Rt2 of the second rotary machine MG2. In the description below, the rotation speed of the rotation shaft Sh is referred to as "shaft rotation speed Ns". The rotation speed of the rotor Rt2 is referred to as "MG2 rotation speed Nm2". The rotation speed of the output shaft 20 is referred to as "output shaft rotation speed Nout".

Figure 5:
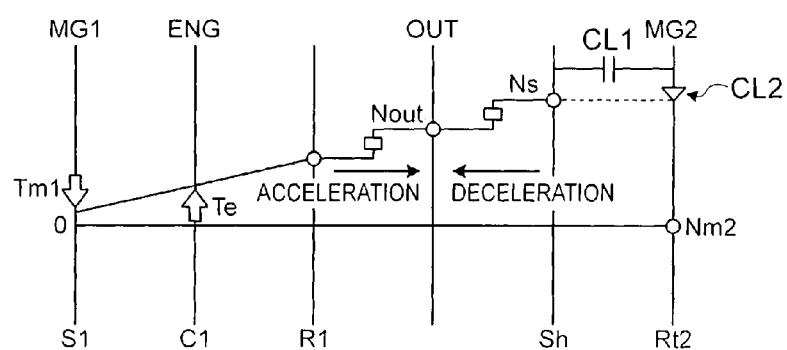
FIG. 5 is a collinear diagram illustrating an example of a traveling state according to the first embodiment.
Figure 6:
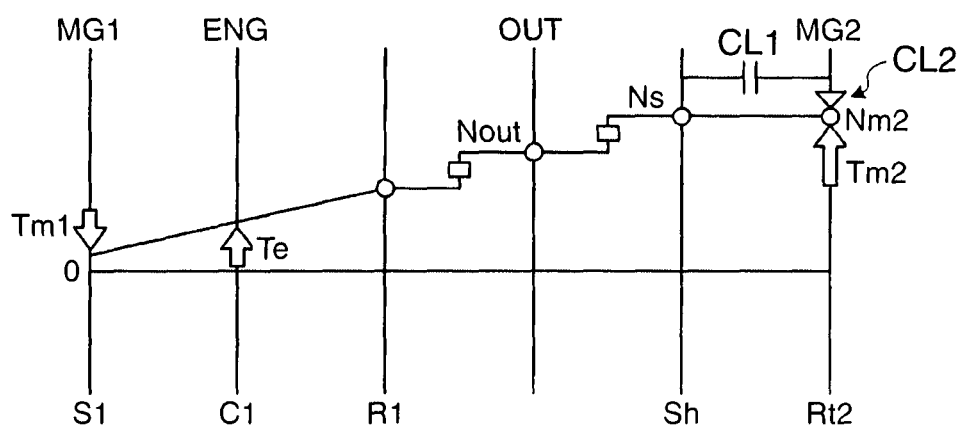
FIG. 6 is a collinear diagram illustrating another example of the traveling state according to the first embodiment.
Figure 7:
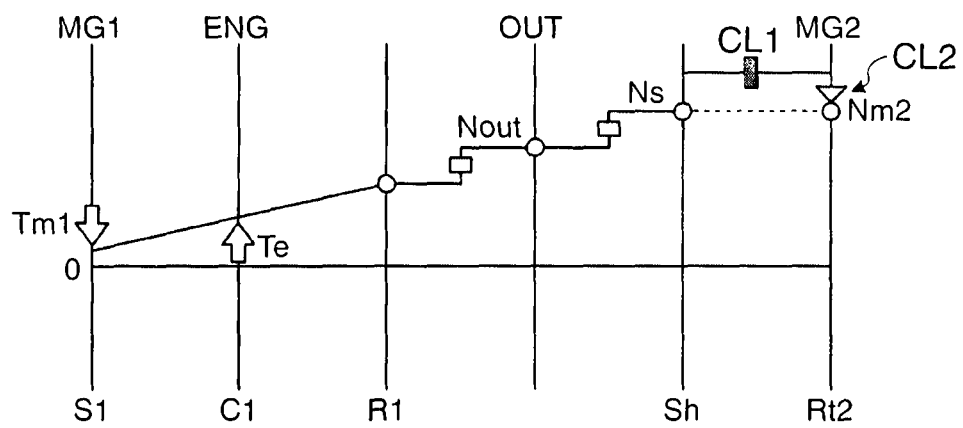
FIG. 7 is a collinear diagram illustrating still another example of the traveling state according to the first embodiment.

FIGS. 5 and 6 illustrate a state where the first clutch CL1 is disengaged. FIG. 7 illustrates a state where the first clutch CL1 is engaged.

In the vehicle 1 according to this embodiment, as illustrated in FIG. 3, the outer diameter of the ring gear R1 is greater than the outer diameter of the driven gear 21. Accordingly, the rotation of the ring gear R1 is increased in speed and is then transmitted to the output shaft 20. The outer diameter of the reduction gear 31 is smaller than the outer diameter of the driven gear 21. Accordingly, the shaft rotation speed Ns of the rotation shaft Sh is decreased and is then transmitted to the output shaft 20. That is, the reduction gear 31 is a gear that can decrease and transmit the MG2 rotation speed Nm2 to the output shaft 20.

The second clutch CL2 is switched to the disengaged state as illustrated in FIG. 5 when the MG2 rotation speed Nm2 is lower than the shaft rotation speed Ns (including a case in which the second rotary machine MG2 rotates negatively) while the vehicle 1 travels forward. On the other hand, the second clutch CL2 is switched to the engaged state as illustrated in FIG. 6 and transmits power from the second rotary machine MG2 to the rotation shaft Sh when the MG2 rotation speed Nm2 is synchronized with the shaft rotation speed Ns. That is, when the vehicle 1 travels forward and the MG2 rotation speed Nm2 is increased by setting the MG2 torque Tm2 to the positive torque, the second clutch CL2 is engaged. Accordingly, the MG2 torque Tm2 is transmitted to the rotation shaft Sh via the second clutch CL2.

When the MG2 rotation speed Nm2 is lower than the shaft rotation speed Ns while the vehicle travels forward, the second clutch CL2 is switched to the disengaged state. That is, when the rotation speed of the second rotary machine MG2 is decreased from the state in which the vehicle travels forward using the second rotary machine MG2 as a drive source by causing the second rotary machine MG2 to perform powering, the second clutch CL2 is switched from the engaged state to the disengaged state. Accordingly, when the first clutch CL1 is in the disengaged state, the second clutch CL2 can be switched to the disengaged state by decreasing the rotation speed of the second rotary machine MG2. When the second clutch CL2 is in the disengaged state, the second rotary machine MG2 is separated from the power transmission member 11. Accordingly, the vehicle 1 can also travel while the rotation of the second rotary machine MG2 is stopped.

As illustrated in FIG. 7, when the first clutch CL1 is in the engaged state, a torque in any rotation direction can be transmitted between the second rotary machine MG2 and the rotation shaft Sh. Accordingly, when the vehicle travels forward with the first clutch CL1 in the engaged state, the vehicle 1 can be accelerated with the positive torque output from the second rotary machine MG2 and the vehicle 1 can also be braked or regenerate energy by causing the second rotary machine MG2 to generate a negative torque.

The control unit 40 controls engagement or disengagement of the first clutch CL1, for example, as illustrated in FIG. 8. FIG. 8 illustrates, combinations of the positive and negative signs of the rotation direction of the second rotary machine MG2, the positive and negative signs of the torque, and the clutches in the engaged state. When the second rotary machine MG2 rotates positively and the MG2 torque is a positive torque, that is, when the vehicle travels forward using the second rotary machine MG2 as a drive source or when the engine 2 is started with the MG2 torque, the first clutch CL1 is in, the disengaged state. Accordingly, the second clutch CL2 is engaged when power is transmitted from the second rotary machine MG2 to the power transmission member 11.

When the second rotary machine MG2 rotates positively and the MG2 torque is a negative torque, that is, when the torque in the braking direction is output from the second rotary machine MG2 while the vehicle travels forward, the first clutch CL1 is engaged. Accordingly, the braking torque output from the second rotary machine MG2 is transmitted to the power transmission member 11 via the first clutch CL1 and the regeneration of power by the second rotary machine MG2 and the like is performed.

When the second rotary machine MG2 rotates negatively and the MG2 torque is a positive torque, that is, when the vehicle travels in reverse with the second rotary machine MG2 as a drive source, the first clutch CL1 is engaged. Accordingly, the torque in the negative rotation direction from the second rotary machine MG2 is transmitted to the power transmission member 11 via the first clutch CL1 and the vehicle 1 can be driven to travel in reverse with the MG2 torque.

When the second rotary machine MG2 rotates negatively and the MG2 torque is a negative torque, for example, when the torque in the braking direction is output from the second rotary machine MG2 while the vehicle travels in reverse, the first clutch CL1 is engaged. In this combination of the rotation direction and the torque direction, the second clutch CL2 is engaged in principle. Accordingly, it may be considered that the first clutch CL1 is in the disengaged state. However, the case of this combination of the rotation direction and the torque typically includes a case in which the braking operation is performed at the time of traveling in reverse, and the frequency of the braking operation is low. At the time of traveling in reverse, the ON and OFF states of the brake may be frequently switched to each other. When the engagement and the disengagement of the first clutch CL1 are repeated whenever the ON and OFF states of the brake are switched, the control becomes complicated, which is not desirable. Accordingly, in this embodiment, when the second rotary machine MG2 rotates negatively as described above, the first clutch CL1 is maintained in the engaged state.

The mode determining unit 50b of the HV_ECU 50 selects an HV traveling mode or an EV traveling mode on the basis of the calculated request drive force, the calculated vehicle speed, or the like. The HV traveling mode is a traveling mode in which the vehicle 1 travels with at least the engine 2 as a drive source. In the HV traveling mode, the first rotary machine MG1 can serve as a part receiving a reaction force against the engine torque. The first rotary machine MG1 generates a reaction torque Tm1 against the engine torque Te and outputs power of the engine 2 from the ring gear R1, for example, as illustrated in FIG. 5. The power of the engine 2 output from the ring gear R1 is transmitted from the output shaft 20 to the driving wheels 25.

In the HV traveling mode, the first clutch CL1 is, for example, in the disengaged state. Since the first clutch CL1 is of a normally-opened type, the first clutch CL1 does not consume electric power in the disengaged state. Accordingly, by performing the HV traveling mode with the first clutch CL1 set to the disengaged state, it is possible to reduce power consumption.

In the HV traveling mode, the vehicle 1 may travel with the second rotary machine MG2 in addition to the engine 2 as a drive source. When the second rotary machine MG2 is used as the drive source at the time of traveling forward, the HV_ECU 50 causes the second rotary machine MG2 to rotate positively and to output a positive torque. When the MG2 rotation speed Nm2 increases and is synchronized with the shaft rotation speed Ns, the second clutch CL2 is engaged. Accordingly, the power of the second rotary machine MG2 is transmitted to the output shaft 20 via the second clutch CL2 and the rotation shaft Sh.

The HV_ECU 50 can cause the second rotary machine MG2 to perform the regeneration of power in the HV traveling mode. When the second rotary machine MG2 performs regeneration, the HV_ECU 50 switches the first clutch CL1 to the engaged state. When the second clutch CL2 is already engaged, the engaging operation of the first clutch CL1 can be started without any change, because the MG2 rotation speed Nm2 is synchronized with the shaft rotation speed Ns. When the first clutch CL1 is engaged, the HV_ECU 50 causes the second rotary machine MG2 to generate a negative torque (torque in the reverse direction of the rotation direction) and causes the second rotary machine MG2 to generate power.

The EV traveling mode is a traveling mode in which the vehicle 1 travels with the second rotary machine MG2 as a drive source. When the vehicle 1 travels forward in the EV traveling mode, the first clutch CL1 is, for example, in the disengaged state. The HV_ECU 50 causes the second rotary machine MG2 to output the torque in the positive rotation direction and causes the secondary rotary machine MG2 to rotate positively. Accordingly, the second clutch CL2 is engaged and the positive torque output from the second rotary machine MG2 drives the vehicle 1 to move forward. The HV_ECU 50 sets the first rotary machine MG1 to a free state in which the first rotary machine MG1 neither performs powering nor performs regeneration in the EV traveling mode. Accordingly, in the EV traveling mode, the rotation of the engine 2 is stopped and the first rotary machine MGl idles.

The HV_ECU 50 can cause the second rotary machine MG2 to perform regeneration in the EV traveling mode. When the second rotary machine MG2 performs regeneration, the HV_ECU 50 switches the first clutch CL1 to the engaged state. When the first clutch CL1 is engaged, the HV_ECU 50 causes the second rotary machine MG2 to generate a negative torque (torque in the reverse direction of the rotation direction) and causes the second rotary machine MG2 to generate power.

The vehicle control system 100 according to this embodiment has a predetermined traveling mode. The predetermined traveling mode is a traveling mode in which the vehicle 1 travels using the engine 2 as a power source with the first clutch CL1 disengaged and with the second rotary machine MG2 separated from the power transmission member 11. The predetermined traveling mode may be considered to be a type of HV traveling mode. In the predetermined traveling mode, the torque generated from the second rotary machine MG2 is neither used as a torque for driving the vehicle 1 nor as a torque for braking the vehicle 1. That is, the second rotary machine MG2 in the predetermined traveling mode is in a rest state in which the second rotary machine is neither operated as a drive force source nor the braking force source of the vehicle 1. Accordingly, the predetermined traveling mode may be referred to as a rest mode in which the second rotary machine MG2 is stopped. The second rotary machine MG2 in the predetermined traveling mode is in a standby state for waiting for transition to the HV traveling mode or the like using the second rotary machine MG2 as a power source. Therefore, the predetermined traveling mode may be referred to as a standby mode for causing the second rotary machine MG2 to wait.

In this embodiment, in the predetermined traveling mode, the vehicle 1 travels with the rotation of the second rotary machine MG2 stopped. Since the second rotary machine MG2 is stopped in the predetermined traveling mode, a dragging loss, a mechanical loss, an electrical loss, and the like of the second rotary machine MG2 are reduced. Here, the state in which the second rotary machine MG2 is stopped in the predetermined traveling mode includes a state in which the MG2 rotation speed Nm2 is zero, a state in which the second rotary machine MG2 rotates at the MG2 rotation speed Nm2 which is a low rotation speed (for example, several tens of rpm) equal to or less than a detection limit of the MG2 rotation speed sensor, and the like.

In this embodiment, the mode determining unit 50b of the control unit 40 determines whether to perform the predetermined traveling mode on the basis of the operating zone. The mode determining unit 50*b* determines whether to perform the predetermined traveling mode, for example, on the basis of the vehicle speed and the drive force. The predetermined traveling mode is performed, for example, in a low-load operating zone. In the low-load operating zone, for example, the operating zone in which a request drive force for the vehicle 1 can be output on the basis of the output torque of the engine 2, it is thought that it is advantageous to separate the second rotary machine MG2 from the power transmission member 11.

For example, in a zone with a high vehicle speed and a low load, the predetermined traveling mode may be performed. In a high vehicle speed zone, the rotation speed of the engine 2 is relatively high and the engine 2 can be operated at an operating point at which the efficiency is good. In the high vehicle speed zone, the dragging loss or the mechanical loss occurring in the second rotary machine MG2 is likely to be large. In other words, it is thought that there is a great merit obtained by separating the second rotary machine MG2 from the power transmission member 11 in the predetermined traveling mode.

Figure 9:
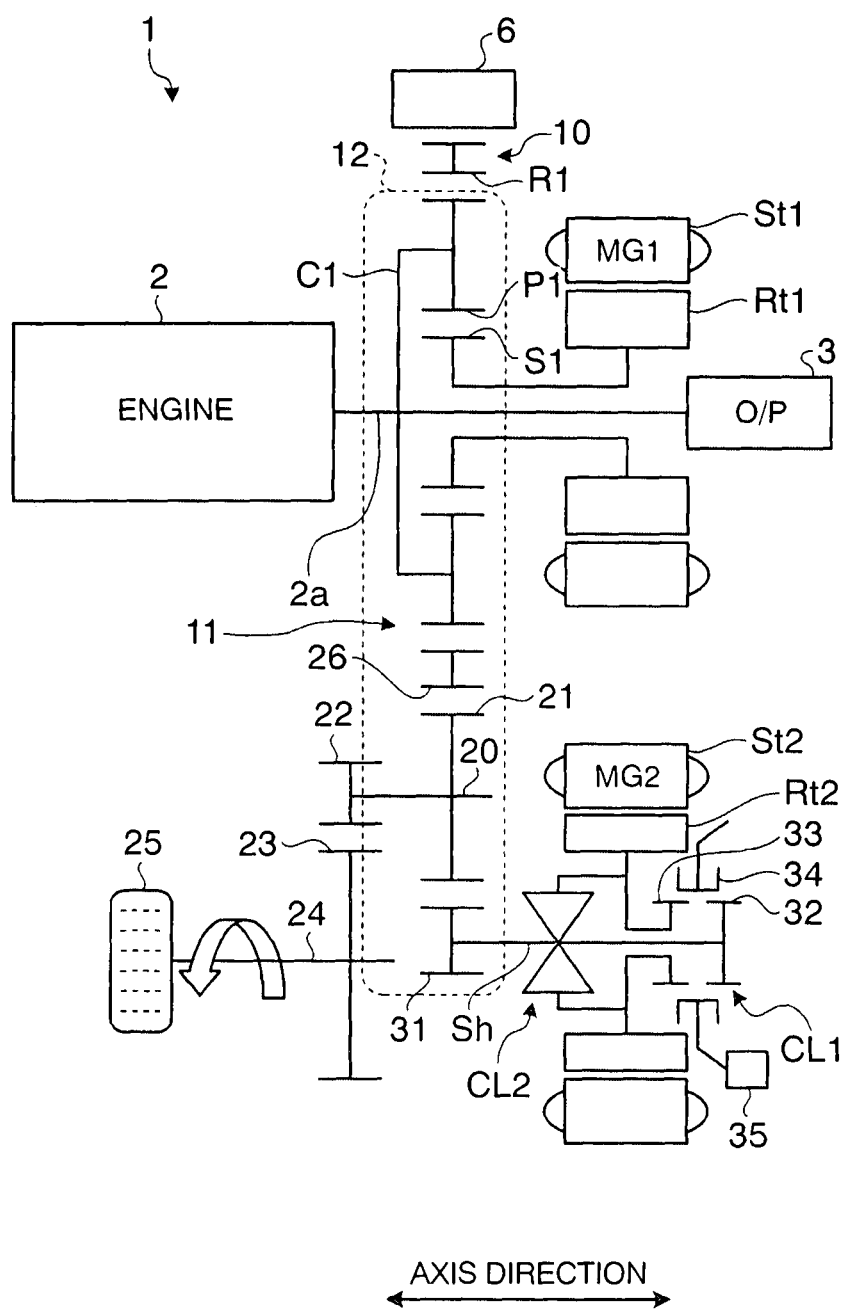
FIG. 9 is a diagram illustrating a torsional load.

In some cases, a torsional load may be applied to the power transmission member 11 of the vehicle 1. An example thereof is a state in which the rotation of the output gear 26 is inhibited by the parking unit 6. In the state in which the rotation of the output gear 26 is inhibited, when a torque is input to the power transmission member 11, a torsional load acts on the power transmission member 11. Specifically, as indicated by a dotted line in FIG. 9, a torsional load acts on the transmission mechanism 12 including the planetary gear mechanism 10, the output shaft 2*a*, the driven gear 21, the reduction gear 31, and the rotation shaft Sh. An example of the case in which a torsional load acts on the power transmission member 11 is a case in which a torque is applied to the driving wheels 25 from the outside as illustrated in FIG. 9 and a typical example thereof is a case in which the vehicle 1 stops (is stationary) on a slope road.

In the vehicle 1 according to this embodiment, the engine 2 is connected to one side of the transmission mechanism 12 and the second rotary machine MG2 is connected to the other side. The engine 2 and the second rotary machine MG2 have large inertia (mass). When the parking unit 6 is unlocked in a state in which a torsional load acts on the transmission mechanism 12, torsional energy accumulated in the transmission mechanism 12 is released. When the torsional energy is released from the transmission mechanism 12 of which both ends are connected to large inertia, fluctuation occurs between the engine 2 and the second rotary machine MG2. Accordingly, as will be described below with reference to FIG. 15, discomfortable vibration is likely to occur.

Figure 15:
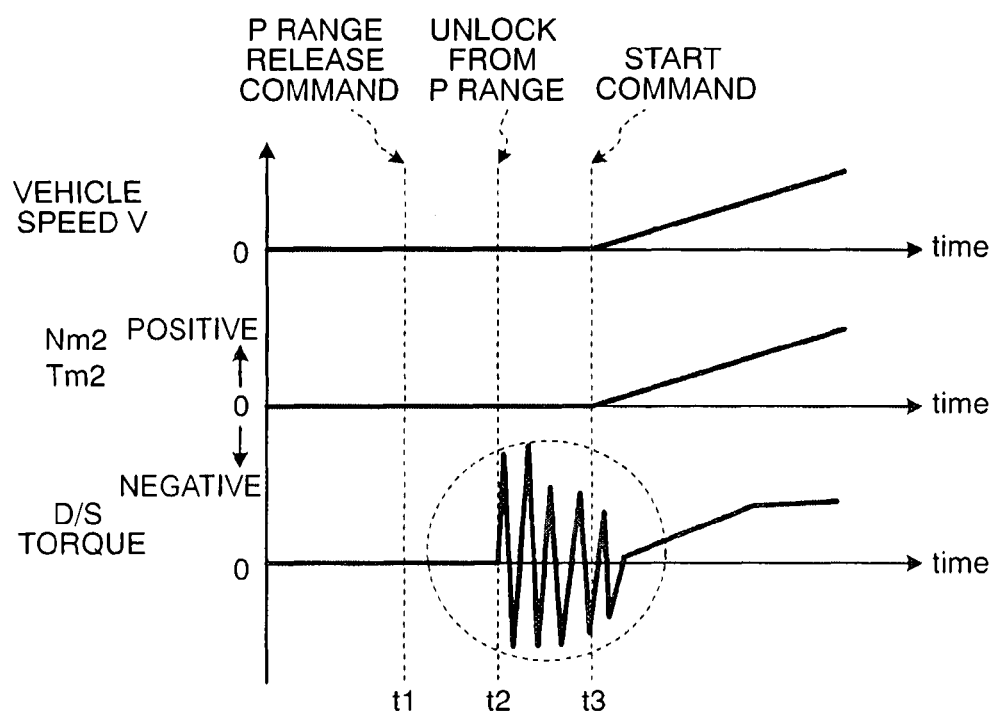
FIG. 15 is a diagram illustrating the occurrence of vibration in a power transmission member.

FIG. 15 is a diagram illustrating occurrence of vibration in the power transmission member. In FIG. 15, the vehicle speed V, the MG2 rotation speed Nm2 or MG2 torque Tm2, the drive shaft torque are illustrated sequentially from the upper end. The drive shaft torque is a torque input to the drive shaft 24. At time t1, a parking range is switched to another range by a driver's operation input and thus unlocking of the parking unit 6 is instructed. In response to the unlocking instruction, the parking unit 6 in the locked state is unlocked at time t2. Since the torsional energy of the power transmission member 11 is released by unlocking of the parking unit 6, large torque vibration occurs in the drive shaft 24. Accordingly, the vehicle 1 vibrates or a large load is applied to the shafts such as the drive shaft 24.

On the contrary, the control unit 40 of the vehicle control system 100 according to this embodiment controls the second rotary machine MG2 depending on the torsional load acting on the power transmission member 11. The control of the second rotary machine MG2 that is performed herein is reduction control of reducing the torsional load acting on the power transmission member 11 or reducing vibration or damage torque due to the torsional load. Specifically, the control unit 40 in this embodiment, rotates the second rotary machine MG2 in the rotation direction in which the second clutch CL2 is disengaged before unlocking the parking unit 6 when a request for unlocking the parking unit 6 is given. When the parking unit 6 is in the locked state, a torsional load is likely to act on the power transmission member 11. Accordingly, when the parking unit 6 is disengaged, the torsional energy accumulated in the power transmission member 11 is released and thus vibration is likely to occur. According to this embodiment, it is possible to control the second rotary machine MG2 depending on the torsional load by performing the reduction control when a request for unlocking the parking unit 6 is given.

The vehicle control system 100 according to this embodiment disengages the second clutch CL2 in advance to intercept power transmission between the second rotary machine MG2 and the power transmission member 11 when the parking unit 6 is unlocked, that is, when vibration or the like is likely to occur due to the release of the torsional energy. Accordingly, according to the vehicle control system 100 according to this embodiment, it is possible to reduce occurrence of vibration due to the release of the torsional energy as will be described with reference to FIG. 10.

Figure 10:
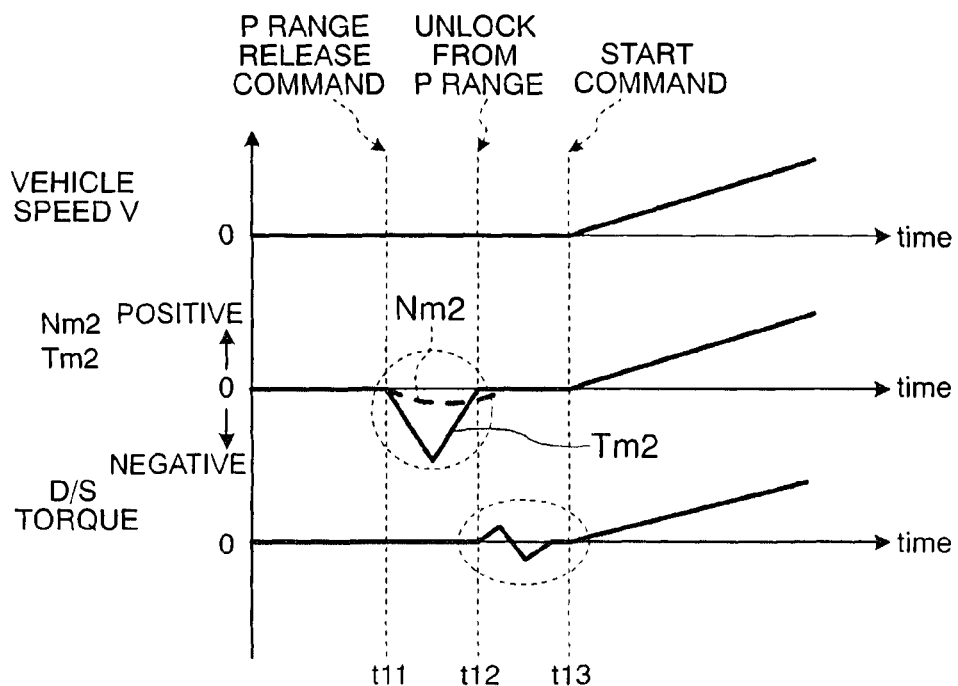
FIG. 10 is a timing chart illustrating operations of the vehicle control system according to the first embodiment.

In FIG. 10, the solid line of the MG2 rotation speed Nm2 or the MG2 torque Tm2 represents the value of the MG2 torque Tm2 and the dotted line thereof represents the value of the MG2 rotation speed Nm2. At time t11, the parking range is switched to another range by the driver's operation input, whereby it is instructed to unlock the parking unit 6. The control unit 40 rotates the second rotary machine MG2 in the rotation direction in which the second clutch CL2 is disengaged, when detecting the instruction to unlock the parking unit 6. In this embodiment, the rotation direction in which the second clutch CL2 is disengaged is the negative rotation direction out of the rotation directions of the second rotary machine MG2. When it is instructed to unlock the parking unit 6, the control unit 40 outputs a torque in the negative rotation direction to the second rotary machine MG2 so as to rotate the second rotary machine MG2 in the negative rotation direction before the parking unit 6 is released.

The control unit 40 continues to output the torque in the negative rotation direction to the second rotary machine MG2 for a predetermined time after the unlocking instruction is given. In this embodiment, the second rotary machine MG2 outputs the torque in the negative rotation direction up to time t12 at which the parking unit 6 is unlocked. Even after the output of the torque is stopped at time t12, the second rotary machine MG2 continues to rotate in the negative rotation direction. That is, the rotor Rt2 of the second rotary machine MG2 continues to rotate in the negative rotation direction relative to the rotation shaft Sh. Accordingly, even when the parking unit 6 is unlocked, the torsional energy is released, and the rotation shaft Sh fluctuates, the engagement of the second clutch CL2 is suppressed.

In this way, according to the reduction control in this embodiment, the state in which the power transmission between the second rotary machine MG2 and the power transmission member 11 is intercepted is maintained by the reverse rotation control of the second rotary machine MG2.

By separating the second rotary machine MG2 from the power transmission member 11, the inertia of the power transmission member 11 is reduced. Accordingly, as illustrated in FIG. 10, the amplitude of the drive shaft torque after the parking unit 6 is unlocked decreases. Since the inertia of the power transmission member 11 decreases, the torque vibration of the drive shaft 24 early converges. In FIG. 10, the torque vibration of the drive shaft 24 converges before time t13 at which it is instructed to start the vehicle 1. On the other hand, as illustrated in FIG. 15, when the second rotary machine MG2 is connected to the power transmission member 11, the time until the torque vibration converges is extended. In FIG. 15, at time t3 at which it is instructed to start the vehicle, the torque vibration does not converge yet.

Figure 1:
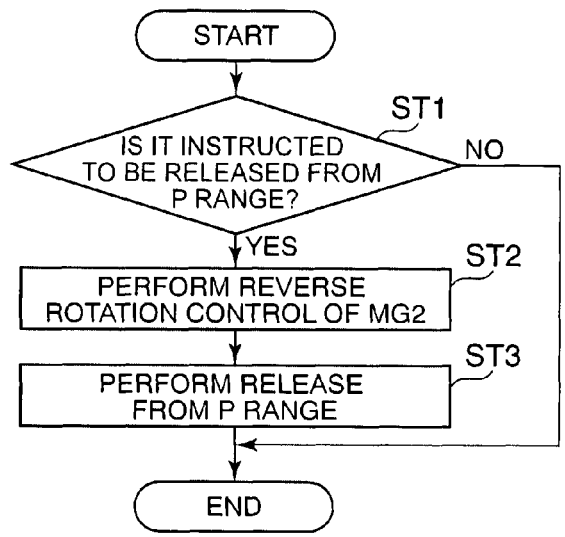
FIG. 1 is a flowchart illustrating an operation flow of a vehicle control system according to a first embodiment of the invention.

The operation of the vehicle control system 100 according to this embodiment will be described below with reference to FIG. 1. The control flow illustrated in FIG. 1 is repeatedly performed with a predetermined cycle, for example, after the parking unit 6 is switched to the locked state. In step ST1, the reduction control instructing unit 50c determines whether an instruction to be released from the P range is detected. The reduction control instructing unit 50c performs the determination of step ST1, for example, on the basis of the detection result of the shift position sensor 5. The reduction control instructing unit 50c performs the positive determination in step ST1 when the shift position is switched from a parking (P) range to another range. The control flow goes to step ST2 when it is determined in step ST1 that the instruction to be released from the P range is detected (Y in step ST1), and the control flow ends otherwise (N in step ST1).

In step ST2, the reduction control instructing unit 50c performs reverse rotation control of the second rotary machine MG2. The reduction control instructing unit 50c outputs a disengagement command to the first clutch CL1 when the first clutch CL1 is engaged. The reduction control instructing unit 50c commands the MG_ECU 60 to rotate the second rotary machine MG2 reversely. The MG_ECU 60 outputs a torque in the negative rotation direction (reverse rotation direction) to the second rotary machine MG2 to rotate the second rotary machine MG2 reversely. The reduction control instructing unit 50c commands the second rotary machine MG2 to rotate reversely, for example, at least until the parking unit 6 is actually unlocked. Alternatively, the reduction control instructing unit 50c may command the second rotary machine MG2 to rotate reversely until the torque variation of the drive shaft torque converges even after the parking unit 6 is unlocked. The reduction control instructing unit 50c may command the second rotary machine MG2 to rotate reversely until a start instruction is given. After step ST2 is performed, the control flow goes to step ST3.

In step ST3, the reduction control instructing unit 50c performs the release from the P range. The reduction control instructing unit 50c gives a release command to the parking unit 6. The parking unit 6 moves the parking pole in the unlocking direction to release the engagement with the output gear 26 in response to the unlocking command. After the unlocking of the parking unit 6 is performed, the control flow ends.

As described above, the control unit 40 of this embodiment rotates the second rotary machine MG2 in the rotation direction in which the second clutch CL2 is disengaged (ST2) before the parking unit 6 is unlocked, when an unlocking request to unlock the parking unit 6 is given (Y in ST1). The smaller the inertia corresponding to the second rotary machine MG2 becomes, the smaller the load acting on the shafts after the parking unit 6 is unlocked becomes. Accordingly, The vehicle control system 100 according to this embodiment can suppress vibration, noise, and the like due to the torsional load. By reducing the load when the parking unit 6 is unlocked, it is possible to skip heat treatment of the shafts or to decrease the diameters of the shafts. As a result, it is possible to achieve a merit of a decrease in costs.

In this embodiment, the control unit 40 controls locking and unlocking of the parking unit 6. The control unit 40 outputs an unlocking command to the parking unit 6 (ST3) after rotating the second rotary machine MG2 reversely (ST2). Accordingly, both of the timing to rotate the second rotary machine MG2 reversely and the timing to unlock the parking unit 6 are controlled by the control unit 40. As a result, it is possible to more satisfactorily suppress vibration or the like due to the torsional load.

Figure 11:
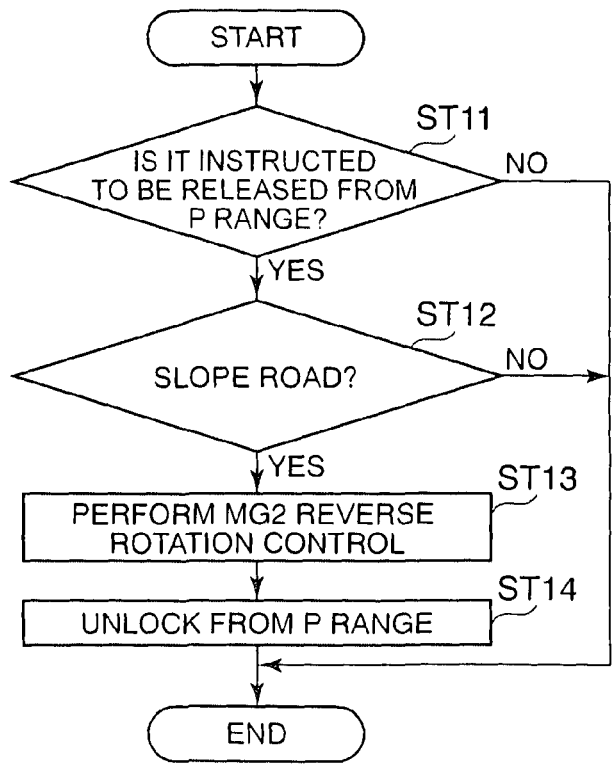
FIG. 11 is a flowchart illustrating an operation flow of a vehicle control system according to a modification example of the first embodiment of the invention.

A modification example of the first embodiment will be described below. FIG. 11 is a flowchart illustrating an operation flow of a vehicle control system according to a modification example of the first embodiment. This modification example is different from the first embodiment, in that reduction control is performed when it is determined that a current road is a slope road. When the vehicle 1 stops on a slope road, the energy released at the time of unlocking the parking unit 6 becomes particularly greater. According to this modification example, it is possible to suppress power consumption due to performing of the reduction control by performing the reduction control on the second rotary machine MG2 only when it is determined that a current road is a slope road.

The operation of the vehicle control system 100 according to this modification example will be described below with reference to FIG. 11. The control flow illustrated in FIG. 11 is repeatedly performed with a predetermined cycle, for example, after the parking unit 6 is locked. In step ST11, the reduction control instructing unit 50c determines whether an instruction to be released from the P range is detected. The control flow goes to step ST12 when it is determined that the instruction to be released from the P range is detected (Y in step ST11), and the control flow ends otherwise (N in step ST11).

In step ST12, the reduction control instructing unit 50c determines whether a current road is a slope road. The HV_ECU 50 determines whether a current road is a slope road, for example, on the basis of the detection result of an acceleration sensor detecting forward and reward acceleration G of the vehicle 1. The control flow goes to step ST13 when it is determined in step ST12 that the current road is a slope road (Y in step ST12), and the control flow ends otherwise (N in step ST12).

In step ST13, the reduction control instructing unit 50c performs reverse rotation control of the second rotary machine MG2. Details of the reduction control instructing unit 50c may be the same as the control details in the first embodiment. After step ST13 is performed, the control flow goes to step ST14.

In step ST14, the reduction control instructing unit 50c performs the release from the P range. After the unlocking of the parking unit 6 is performed, the control flow ends.

In this way, the control unit 40 of this modification example rotates the second rotary machine MG2 in the rotation direction in which the second clutch CL2 is disengaged (ST13) before the parking unit 6 is unlocked, when an unlocking request to unlock the parking unit 6 is given (Y in ST11) and the vehicle 1 stops on a slope road (Y in ST12).

Accordingly, according to this modification example, it is possible to make the suppression of vibration and the decrease in power consumption compatible with each other. By reducing the load on the shafts at the time of unlocking the parking unit 6 on a slope road, it is possible to reduce the strength required for the shafts.

Figure 12:
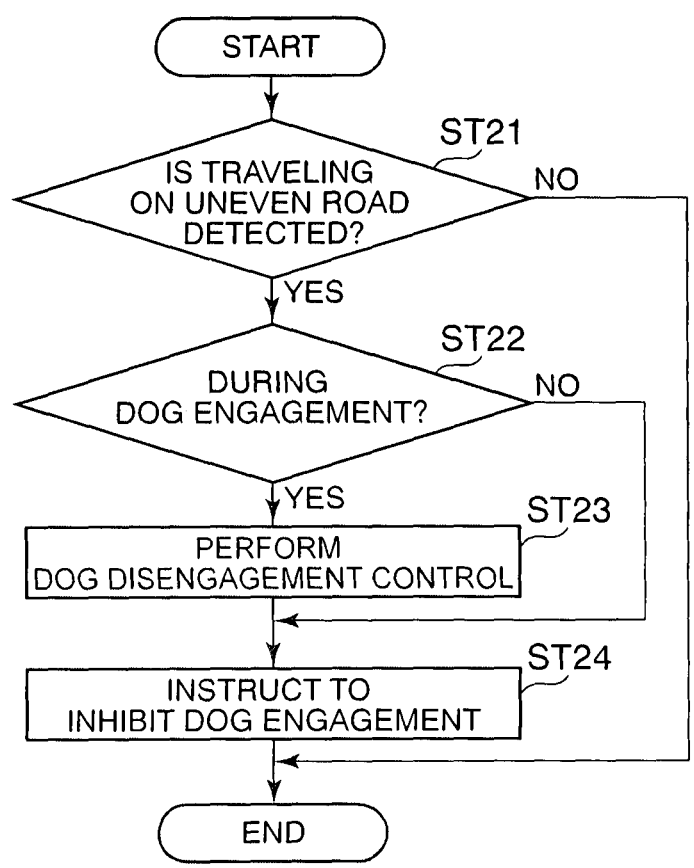
FIG. 12 is a flowchart illustrating an operation flow of a vehicle control system according to a second embodiment of the invention.

A second embodiment of the invention will be described below with reference to FIG. 12. FIG. 12 is a flowchart illustrating an operation flow of a vehicle control system according to the second embodiment. The second embodiment is different from the first embodiment, in that the reduction control is performed when traveling on an uneven road is detected and the first clutch CL1 is disengaged instead of rotating the second rotary machine MG2 reversely in the reduction control.

An uneven road is a road in which unevenness of a road surface is repeated in the traveling direction, for example, a road of which the road surface is uneven in a wave shape. When the vehicle 1 travels on an uneven road, tire slip and tire grip of the vehicle 1 are alternately generated due to the evenness of the road surface. As a result, switching between a driving state and a driven state frequently occurs in the power transmission member 11 between the engine 2 and the second rotary machine MG2 of which both have large inertia. Accordingly, a large load acts on a shaft in the transaxle, for example, the drive shaft 24, or a shock is generated in the vehicle 1.

On the contrary, the vehicle control system 100 according to this embodiment disengages the first clutch CL1 when traveling on an uneven road is detected. When the first clutch CL1 is in the disengaged state, the power transmission between the second rotary machine MG2 and the power transmission member 11 in at least one rotation direction is intercepted. That is, the inertia of the power transmission member 11 is reduced with the torque variation in any one rotation direction. Accordingly, even when the vehicle travels on the same uneven road, it is possible to protect the shaft or to reduce the vibration by reducing the load serving as a reason for the twist of the shafts.

The operation of the vehicle control system 100 according to the second embodiment will be described below with reference to FIG. 12. The control flow illustrated in FIG. 12 is repeatedly performed with a predetermined cycle, for example, in travel. In step ST21, the reduction control instructing unit 50c determines whether the traveling on an uneven road is detected. The reduction control instructing unit 50c performs the determination of step S21, for example, on the basis of a variation in tire torque in travel. For example, the variation in tire torque can be calculated on the basis of the values of the engine torque and the MG2 torque Tm2 and the rotation speed of a tire. Instead, the traveling on an uneven road may be detected by the detection of slipping by a damper limiter unit disposed in the power transmission member 11 or the operation of an antilock brake system (ABS). The control flow goes to step ST22 when it is determined in step ST21 that the traveling on an uneven road is detected (Y in step ST21), and the control flow ends otherwise (N in step ST21).

In step ST22, the reduction control instructing unit 50c determines whether the first clutch CL1 is engaged. The control flow goes to step ST23 when it is determined that the first clutch CL1 is engaged (Y in step ST22), and the control flow goes to step ST24 otherwise (N in step ST22).

In step ST23, the reduction control instructing unit 50c performs disengagement control of the first clutch CL1. The reduction control instructing unit 50c outputs a disengagement command to the first clutch CL1. The first clutch CL1 operates the actuator 35 to disengage the rotor Rt2 and the rotation shaft Sh in response to the disengagement command. After step ST23 is performed, the control flow goes to step ST24.

In step ST24, the reduction control instructing unit 50c instructs the first clutch CL1 to inhibit engagement. The reduction control instructing unit 50c sets, for example, an engagement inhibition flag to ON. The engagement inhibition flag is a flag indicating that the engagement of the first clutch CL1 is inhibited. When the engagement inhibition flag is set to ON, instruction to engage the first clutch CL1 is inhibited. The reduction control instructing unit 50c continues to inhibit the engagement of the first clutch CL1, for example, until the traveling on an uneven road is not detected. After step ST24 is performed, the control flow ends.

As described above, the control unit 40 of this embodiment disengages the first clutch CL1 (ST23) when the vehicle 1 travels on an uneven road (Y in ST21). Accordingly, the vibration or the torsional load of the power transmission member 11 due to the traveling on an uneven road is suppressed.

In the reduction control according to this embodiment, the second rotary machine MG2 may be controlled. For example, control of rotating the second rotary machine MG2 reversely may be performed so as to set the second clutch CL2 to the disengaged state while the traveling on an uneven road is detected. Accordingly, the load acting on the shafts or the vibration thereof due to torque in any rotation direction from the road surface to the tires can be reduced. That is, in the reduction control according to the second embodiment, only the first clutch CL1 may be controlled or both the first clutch CL1 and the second rotary machine MG2 may be controlled depending on the torsional load acting on the power transmission member 11.

Whether to control the second rotary machine MG2 in the reduction control may be determined, for example, depending on the magnitude of an input from a road surface. For example, when the variation in tire torque on an uneven road is equal to or greater than a threshold value, the second rotary machine MG2 may be rotated reversely.

Figure 13:
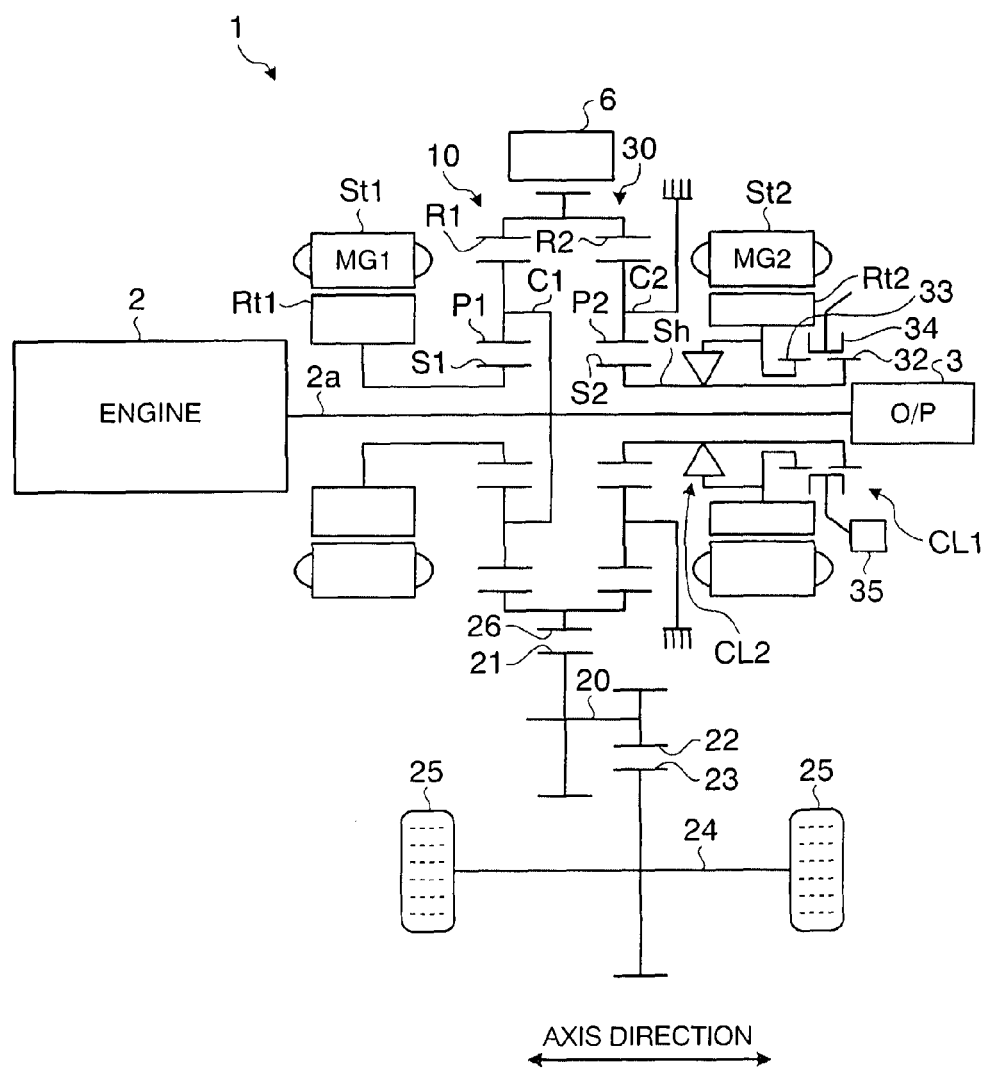
FIG. 13 is a skeleton diagram illustrating a vehicle according to first modification examples of the embodiments.

A first modification example of the first and second embodiments will be described below. FIG. 13 is a skeleton diagram illustrating a vehicle according to the first modification example of the embodiments. The transaxle according to the first and second embodiments is of a multi-axis type in which the output shaft 2a of the engine 2 and the rotation shaft Sh of the second rotary machine MG2 are located in different axes. The transaxle according to the first modification example is different from that in the above-mentioned embodiments, in that the transaxle is of a single-axis type in which the engine 2 and the second rotary machine MG2 are disposed coaxial with each other.

As illustrated in FIG. 13, a first rotary machine MG1, a planetary gear mechanism 10, a second planetary gear mechanism 30, a second rotary machine MG2, and an oil pump 3 are arranged coaxial with the engine 2 sequentially from the side close to the engine 2. The planetary gear mechanism 10 is the same single-pinion planetary gear mechanism as the planetary gear mechanism 10 of the above-mentioned embodiments. The planetary gear mechanism 10 includes a sun gear S1, a pinion gear P1, a ring gear R1, and a carrier C1. The sun gear S1 is connected to the rotor Rt1 of the first rotary machine MG1. The carrier C1 is connected to the output shaft 2a of the engine 2.

The second planetary gear mechanism 30 is a single-pinion planetary gear mechanism and includes a second sun gear S2, a second pinion gear P2, a second ring gear R2, and a second carrier C2. The second sun gear S2 is connected to the rotation shaft Sh and rotates along with the rotation shaft Sh. The second carrier C2 is fixed to the vehicle body side and cannot rotate. The second ring gear R2 is connected to the ring gear R1 and rotates along with the ring gear R1. A common output gear 26 is disposed on the outer circumferences of the ring gear R1 and the second ring gear R2. The output gear 26 meshes with a driven gear 21. The configurations of from the driven gear 21 to the driving wheels 25 may be the same as the configuration of the vehicle 1 according to the above-mentioned embodiments.

A first clutch CL1 and a second clutch CL2 are disposed between the rotation shaft Sh and the rotor Rt2 of the second rotary machine MG2. The second clutch CL2 is disposed in parallel to the first clutch CL1. The configurations of the first clutch CL1 and the second clutch CL2 may be the same as in the above-mentioned embodiments. In the vehicle 1 according to the second modification example, the positive rotation direction of the second rotary machine MG2 is opposite to the rotation direction of the output gear 26 when the vehicle 1 travels forward. The vehicle 1 according to this modification example is equipped with the same vehicle control system 100 as the vehicle control system 100 (FIGS. 2, 4) according to the above-mentioned embodiments. In the vehicle 1 according to this modification example, the vehicle control system 100 can perform the same control as in the above-mentioned embodiments and can achieve the same advantages.

Figure 14:
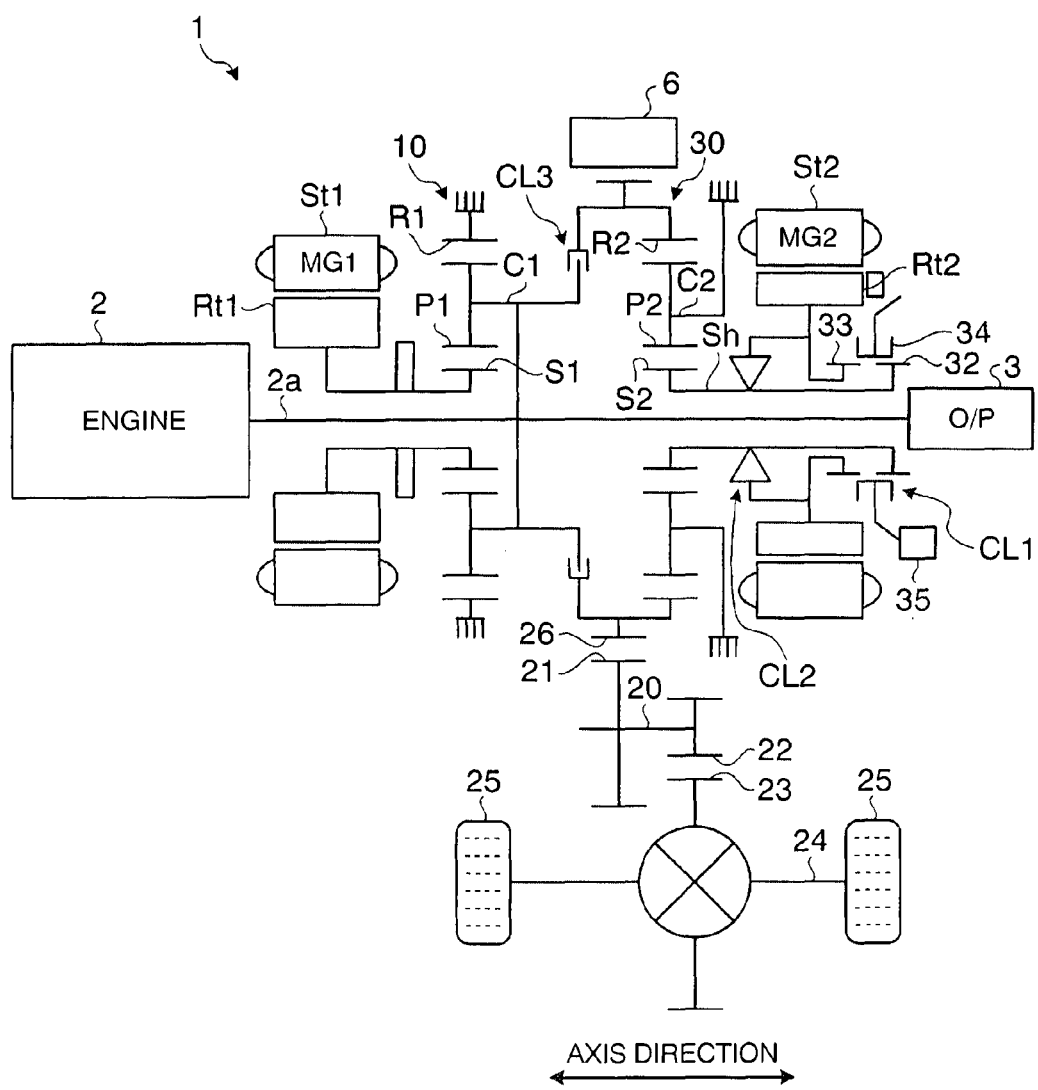
FIG. 14 is a skeleton diagram illustrating a vehicle according to second modification examples of the embodiments.

A second modification example of the first and second embodiments will be described below. FIG. 14 is a skeleton diagram illustrating a vehicle according to the second modification example of the embodiments. The vehicle 1 according to the second modification example includes a third clutch CL3 disposed between the planetary gear mechanism 10 and the output gear 26. The third clutch CL3 is disposed between the carrier C1 and the output gear 26 and the second ring gear R2. The third clutch CL3 is, for example, a frictional engagement type multi-disk clutch and can be arbitrarily switched between an engaged state and a disengaged state. The sun gear S1 of the planetary gear mechanism 10 is connected to the rotor Rt1 of the first rotary machine MG1. The carrier C1 is connected to the output shaft 2a of the engine 2 and the third clutch CL3. The ring gear R1 is fixed to the vehicle body side and cannot rotate. The other configurations may be the same as the configurations of the vehicle 1 (FIG. 13) according to the first modification example of the embodiments.

In the vehicle 1, by disengaging the third clutch CL3, the cutoff state in which the side of the engine 2 and the first rotary machine MG1 and the side of the driving wheels 25 and the second rotary machine MG2 are disconnected. In the disconnected state, a series hybrid traveling mode can be carried out in which the vehicle 1 travels using the second rotary machine MG2 as the drive source by converting the power of the engine 2 into electric power through the use of the first rotary machine MG1 and supplying the electric power to the second rotary machine MG2. On the other hand, when the third clutch CL3 is engaged, the side of the engine 2 and the first rotary machine MG1 and the side of the driving wheels 25 and the second rotary machine MG2 are connected to each other. In the connected state, the parallel hybrid traveling mode can be carried out similarly to the above-mentioned embodiments or the first modification example of the embodiments.

The vehicle 1 according to this modification example is equipped with the same vehicle control system 100 as the vehicle control system 100 (FIGS. 2, 4) according to the above-mentioned embodiments. In the vehicle 1 according to this modification example, the vehicle control system 100 can perform the same control as in the above-mentioned embodiments and can achieve the same advantages. For example, the same reduction control as in the above-mentioned embodiments may be performed regardless of whether the third clutch CL3 is engaged or disengaged. When the third clutch CL3 is disengaged, the engine 2 is separated from the second rotary machine MG2 or the tires. However, since the second rotary machine MG2 having large inertia is connected to the power transmission member 11 closer to the output side (the driving wheels 25 side) than the third clutch CL3, it is thought that a large load is likely to be applied to the shafts or vibration is likely to occur thereon.

Therefore, even when the third clutch CL3 is disengaged as well as when the third clutch CL3 is engaged, it is preferable that the vehicle control system 100 control at least one of the second rotary machine MG2 or the first clutch CL1 depending on the torsional load acting on the power transmission member 11. For example, when an unlocking request to unlock the parking unit 6 is given, it is preferable that the control unit 40 rotate the second rotary machine MG2 in the rotation direction in which the second clutch CL2 is disengaged. When the vehicle 1 travels on an uneven road, it is preferable that the control unit 40 disengage the first clutch CL1. When the vehicle 1 stops on a slope road, it is preferable that the control unit 40 perform the reduction control using the second rotary machine MG2.

A third modification example of the first and second embodiments will be described below. In the above-mentioned embodiments, the rotation of the second rotary machine MG2 is stopped in the predetermined traveling mode, but the operating state of the second rotary machine MG2 in the predetermined traveling mode is not limited thereto. For example, in the predetermined traveling modem, the second rotary machine MG2 may rotates in the positive rotation direction at a rotation speed lower than the shaft rotation speed Ns. When the MG2 rotation speed Nm2 is lower than the shaft rotation speed Ns, the loss such as the dragging loss is reduced more than when the MG2 rotation speed Nm2 is equal to the shaft rotation speed Ns. When the second rotary machine MG2 is rotated in the predetermined traveling mode, the second rotary machine MG2 may be appropriately made to perform the powering or to perform the regeneration.

The configuration of the vehicle 1 is not limited to the configurations described in the above-mentioned embodiment or the above-mentioned modification examples. For example, the second rotary machine MG2 may be disposed at a position other than described above. In a configuration in which the engine 2, the first rotary machine MG1, and the driving wheels 25 are connected to different rotary elements of the planetary gear mechanism 10, it is preferable that the second rotary machine MG2 be connected to the power transmission member between the planetary gear mechanism 10 and the driving wheels 25 via the clutches CL1, CL2.

The vehicle 1 may be equipped with a single rotary machine (for example, the second rotary machine MG2) instead of being equipped with two rotary machines of the first rotary machine MG1 and the second rotary machine MG2. In this case, the first clutch CL1 and the second clutch CL2 can be disposed between the single rotary machine and the power transmission member 11. The first clutch CL1 is not limited to the dog clutch, and may employ a friction type clutch. The first clutch CL1 may employ, for example, a wet or dry multi-disk clutch. The second clutch CL2 is not limited to the above-mentioned sprag type one-way clutch, and may employ another type one-way clutch. That is, the second clutch CL2 only has to have a function of transmitting a torque in one direction from one engagement element to the other engagement element and intercepting the transmission of a torque in the other direction.

The details described in the above-mentioned embodiment and the above-mentioned modification examples may be appropriately combined for practice.

What is claimed is:

1. A controller for a vehicle, the vehicle including an engine, a rotary machine, at least one driving wheel, a first clutch disposed between a power transmission member and the rotary machine, and a parking unit, the power transmission member being disposed between the engine and the driving wheel, the first clutch being configured to be switched to an engaged state or a disengaged state, and a second clutch disposed in parallel with the first clutch, and disposed between the power transmission member and the rotary machine, the second clutch being a one-way clutch, the parking unit configured to switch between a locked state in which rotation of the power transmission member is inhibited and an unlocked state in which the rotation of the power transmission member is permitted, the controller comprising:
an electronic control unit configured to control at least one of the rotary machine or the first clutch so as to reduce inertia of the power transmission member based on a torsional load acting on the power transmission member, the electronic control unit configured to rotate the rotary machine in a rotation direction in which the second clutch is disengaged so that the rotary machine is separated from the power transmission member before switching the parking unit to the unlocked state when a request to switch the parking unit to the unlocked state is given.

2. The controller according to claim 1, wherein
the electronic control unit is configured to rotate the rotary machine in the rotation direction in which the second clutch is disengaged when the request to switch the parking unit to the unlocked state is given and the vehicle is stationary on a slope road.

3. The controller according to claim 1, wherein
the electronic control unit is configured to output a command to switch the parking unit to the unlocked state after rotating the rotary machine in the rotation direction in which the second clutch is disengaged.

4. The controller according to claim 1, wherein
the electronic control unit is configured to switch the first clutch to the disengaged state when the electronic control unit detects that the vehicle travels on an uneven road.

5. A controller for a vehicle, the vehicle including an engine, a rotary machine, at least one driving wheel, a first clutch disposed between a power transmission member and the rotary machine, and a parking unit, the power transmission member being disposed between the engine and the driving wheel, the first clutch being configured to be switched to an engaged state or a disengaged state, and a second clutch disposed in parallel with the first clutch, and disposed between the power transmission member and the rotary machine, the second clutch being a one-way clutch, the parking unit configured to switch between a locked state in which rotation of the power transmission member is inhibited and an unlocked state in which the rotation of the power transmission member is permitted, the controller comprising:
an electronic control unit configured to control at least one of the rotary machine or the first clutch so as to intercept power transmission between the power transmission member and the rotary machine based on a torsional load acting on the power transmission member, the electronic control unit configured to rotate the rotary machine in a rotation direction in which the second clutch is disengaged so that the rotary machine is separated from the power transmission member before switching the parking unit to the unlocked state when a request to switch the parking unit to the unlocked state is given.

6. The controller according to claim 5, wherein
the electronic control unit is configured to rotate the rotary machine in the rotation direction in which the second clutch is disengaged when the request to switch the parking unit to the unlocked state is given and the vehicle is stationary on a slope road.

7. The controller according to claim 5, wherein
the electronic control unit is configured to output a command to switch the parking unit to the unlocked state after rotating the rotary machine in the rotation direction in which the second clutch is disengaged.

8. The controller according to claim 5, wherein
the electronic control unit is configured to switch the first clutch to the disengaged state when the electronic control unit detects that the vehicle travels on an uneven road.

* * * * *